United States Patent [19]

Katagiri et al.

[11] 4,370,187

[45] Jan. 25, 1983

[54] PROCESS AND APPARATUS FOR PRODUCING A LAMINATED STRUCTURE COMPOSED OF A SUBSTRATE WEB AND A THERMOPLASTIC RESIN WEB EXTRUSION-COATED THEREON

[75] Inventors: Mikio Katagiri, Ichihara; Yukio Sakota, Chiba; Kunie Hiroshige; Yukio Adachi, both of Ichihara, all of Japan

[73] Assignee: Mitsui Polychemicals Co. Ltd., Tokyo, Japan

[21] Appl. No.: 217,577

[22] Filed: Dec. 18, 1980

[30] Foreign Application Priority Data

Dec. 21, 1979 [JP] Japan .......................... 54-165516

[51] Int. Cl.³ ............................................. B32B 31/30
[52] U.S. Cl. ......................... 156/244.23; 156/244.26; 156/244.27; 156/497; 156/500
[58] Field of Search ............... 156/244.11, 244.17, 156/244.23, 244.24, 244.26, 500, 87, 497, 244.27; 425/72 R, 73, 74

[56] References Cited

U.S. PATENT DOCUMENTS

| 2,850,769 | 9/1958 | Zeigler et al. | 156/87 |
| 3,077,428 | 2/1963 | Heuser et al. | 156/244.23 |
| 3,578,527 | 5/1971 | Sakata et al. | 156/244.23 |

FOREIGN PATENT DOCUMENTS

644814  7/1962  Canada ........................ 156/244.26

*Primary Examiner*—Caleb Weston
*Attorney, Agent, or Firm*—Sherman & Shalloway

[57] ABSTRACT

A laminated structure composed of a substrate web and a thermoplastic resin web extrusion-coated thereon, which is substantially free from an offensive odor, is produced by extrusion-coating the thermoplastic resin web in the molten state through a T-die on the substrate while applying an oxidizing gas to one surface of the as-extruded molten web of the thermoplastic resin and an inert gas to its other surface in a specified space.

10 Claims, 8 Drawing Figures

PROCESS AND APPARATUS FOR PRODUCING A LAMINATED STRUCTURE COMPOSED OF A SUBSTRATE WEB AND A THERMOPLASTIC RESIN WEB EXTRUSION-COATED THEREON

This invention relates to a process and an apparatus for producing an extrusion-laminated structure which is suitable for various applications, particularly for packing of foodstuffs, pharmaceuticals and the like. Particularly, it relates to a process and an apparatus for producing a laminated structure composed of a substrate web and a thermoplastic resin web extrusion-coated on the substrate web, which is substantially free from an offensive odor that is cumbersome in the aforesaid applications, and further has improved low temperature heat-sealing characteristics.

More specifically, in one aspect, this invention provides, in a process for producing a laminated structure composed of a substrate web and a thermoplastic resin web extrusion-coated thereon which comprises melt-extruding a thermoplastic resin from the lip of a T-die composed of a die body and a die jowl to form a thermoplastic resin web in the molten state and passing the thermoplastic resin web together with a substrate in web form through a laminating roll unit consisting at least of a pair of a cooling roll and a nip roll and located apart from the die lip with an air-gap space formed between the die lip and the laminating roll unit, to the improvement wherein (1) in said air-gap space, an oxidizing gas selected from the group consisting of oxygen, ozone, air, a mixture of at least two of these, and a mixture of at least one of oxygen and ozone with an inert gas is applied to that surface of the molten thermoplastic resin web which is to make contact with the substrate web at a flow rate of about 0.02 to about 2 $Nm^3$ per kilogram of the thermoplastic resin extruded, whereby volatile substances evolved from said surface of the molten thermoplastic resin web are blown off and removed from the air-gap space, and (2) in said air-gap space, an inert gas is applied to that surface of the molten thermoplastic resin web which is to make contact with the cooling roll at a flow rate of about 0.02 to about 2 $Nm^3$ per kilogram of the thermoplastic resin extruded, whereby volatile substances evolved from the surface of the molten thermoplastic resin web are blown off and removed from the air-gap space.

Laminated structures composed of a substrate web such as a sheet of paper, an aluminum foil, or a film, sheet or fabric of a synthetic resin and a thermoplastic resin web such as a web of polyethylene, polypropylene, an ethylene/vinyl acetate copolymer or an ionomer extrusion-coated on the substrate web have been used widely as packaging materials for various articles such as foodstuffs and pharmaceuticals. In these applications, the trouble of migration of an offensive odor from the laminated structures to the packed articles has been the technical problem to be solved.

This technical problem is described at some length below by taking up as an example the extrusion coating of polyethylene which is most widely practised. In the extrusion coating of polyethylene, a non-polar polyethylene resin is heated in an extruder usually to a temperature of at least about 300° C., kneaded, and melt-extruded from the lip of a T-die composed of a die body and a die jowl to form a polyethylene resin web in the molten state. The surface of the resulting polyethylene resin web is subjected to air oxidation in an air-gap (which denotes the distance from the lip to a point of pressure contact between a cooling roll and a nip roll) space, thereby to form polar sites on the surface of the web. The polyethyelene resin web is then passed together with a suitable substrate in web form between the cooling roll and the nip roll to bond the two webs and simultaneously cool them, thereby forming a laminated structure. In order to melt-extrude such a non-polar polyethylene resin and bond it to a substrate web under pressure, it is necessary prior to the press-bonding to render the surface of the polyethylene resin web adhesive to the substrate web by air oxidizing it. In order to meet this need, the temperature of the polyethylene resin web melt-extruded through the die should be high, particularly more than about 300° C. Naturally, therefore, the polyethylene resin should be melted and kneaded at a temperature higher than it. Since a shear force caused by the kneading operation is exerted on the polyethylene resin at such a high temperature, partial cleavage or degradation occurs in the molecule of polyethylene to give inevitably low-molecular-weight degradation products.

When the polyethylene resin containing such degradation products is melt-extruded from the die lip and undergoes air oxidation in the air-gap space, partial decomposition or crosslinking of the resin takes place. Consequently, in the resulting laminated structure composed of the substrate web and the polyethylene resin web extrusion-coated on the substrate web, the polyethylene resin web layer is partly decomposed or oxidized, and volatile substances (low-molecular-weight gaseous products) generated by the decomposition and oxidation cause the aforesaid trouble of giving off an offensive odor, and become the main cause of "polyethylene smell".

In an attempt to improve the heat-sealability of a laminated structure composed of a substrate web and a thermoplastic resin web extrusion-coated on the substrate web, a method was proposed previously which comprises maintaining an atmosphere of an inert gas such as nitrogen gas in the aforesaid air-gap space on the side of that surface of the thermoplastic resin web in the molten state which is to make contact with the cooling roll in the laminating roll unit thereby to prevent oxidation of that surface. This prior method is described with reference to FIG. 1 which is a cross-sectional view of an apparatus for use in practising this prior method.

Figure 1:
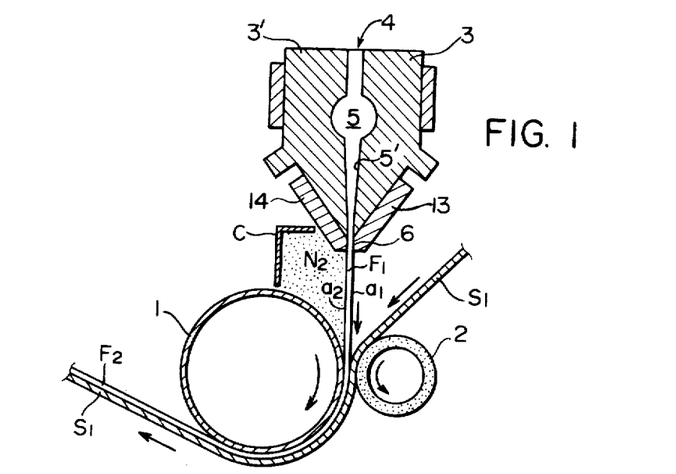
FIG. 1 is a cross-sectional side elevation view of a prior art T-die extrusion apparatus.

This apparatus comprises a combination of an extruder having a T-die consisting of a die body (3,3') and a die jowl (13,14) forming a die lip, and a pair of a cooling roll 1 and a nip roll 2 located away from the die lip with an air-gap space between the die lip and the rolls. In the drawing, the main body of the extruder which is known per se is omitted, and only the T-die portion is shown. Hatchings are omitted in showing the resin within the die and the extruded thermoplastic resin film.

In the embodiment shown in FIG. 1, the thermoplastic resin flow kneaded at a high temperature passes through a T-die entrance 4, spreads to the width (see w in FIG. 3) of T-die in a manifold 5, then flows through a die land 5', and is melt-extruded from a die lip 6 formed of die jowl members 13 and 14 to form a thermoplastic resin web $F_1$ in the molten state. The molten web $F_1$ is passed together with a substrate $S_1$ in web form between the roll 1 and the roll 2 in the laminating roll unit, and the two webs are laminated at a point of pressure contact between these rolls or in its vicinity to form a laminated structure composed of the substrate web $S_1$ and a thermoplastic resin web $F_2$ extrusion-coated thereon.

In the prior art method shown in FIG. 1, an atmosphere of nitrogen gas ($N_2$) is formed by using a suitable covering member C in the air-gap space on the side of the surface $a_2$ of the web $F_1$ which is to make contact with the cooling roll 1. Hence, oxidation with air of the surface $a_2$ kept at a high temperature of the web $F_1$ is prevented, and only the surface $a_1$ of the web $F_1$ which is to make contact with the substrate web $S_1$ undergoes air oxidation. Accordingly, when such a nitrogen gas atmosphere is used, the offensive odor ascribable to the volatile substances evolved in the air-gap space is reduced in comparison with the case of not using such an inert gas atmosphere (that is, when both the surfaces $a_1$ and $a_2$ of the web $F_1$ undergo air oxidation).

It was found however that even according to this prior art method, the trouble of migration of the offensive odor to the packed articles cannot still be obviated when the resulting laminated structure is utilized as a packaging material. This is presumably because considerable or unnegligible amounts of volatile substances are evolved from the web $F_1$ as melt-extruded from the lip of the T-die and look like white smokes which are taken into, or adsorbed to, the laminated structure and cooled as such.

The present inventors made investigations in order to provide a process for producing a laminated structure composed of a substrate web and a thermoplastic resin web extrusion-coated thereon which is free from the trouble of giving off an offensive odor and has improved low-temperature heat-sealing characteristics.

These investigations have led to the discovery that by blowing an oxidizing gas against the surface $a_1$ to be contacted with the substrate web $S_1$ of the thermoplastic resin web $F_1$ in the molten state which has been melt-extruded from the lip of the T-die in the air-gap space, the adhesion of the surface $a_1$ to the substrate web $S_1$ is increased and the volatile substances evolved from the surface $a_1$ are positively blown off and removed from the air-gap space; and that by blowing an inert gas against the surface $a_2$ to be contacted with the cooling roll 1 of the web $F_1$ in the air-gap space, the surface $a_2$ is positively prevented from undergoing air oxidation and the volatile substances evolved from the surface $a_2$ are positively blown off and removed from the air-gap space, thus making it possible to avoid the trouble of the offensive odor of the laminated structure which has been unable to be obviated in the past.

It has also been found that by performing the extrusion-coating under conditions which meet this combination of parameters, the adhesion between the thermoplastic resin web $F_1$ and the substrate web $S_1$ can be improved, the low temperature heat-sealability of the laminated structure can be improved, and the deterioration with time of the heat sealability can be reduced.

The present inventors have also found that the flow rate of the oxidizing gas or the inert gas is desirably selected from the range of about 0.02 to about 2 $Nm^3$ per kilogram of the thermoplastic resin extruded.

It is an object of this invention therefore to provide an improved process for producing a laminated structure composed of a substrate web and a thermoplastic resin web extrusion-coated thereon which gives off little offensive odor.

Another object of this invention is to provide an apparatus for producing an extrusion-laminated structure which is suitable for the practice of the process of this invention.

The above and other objects and advantages of this invention will become more apparent from the following description and accompanying drawings in which:

Figure 2:
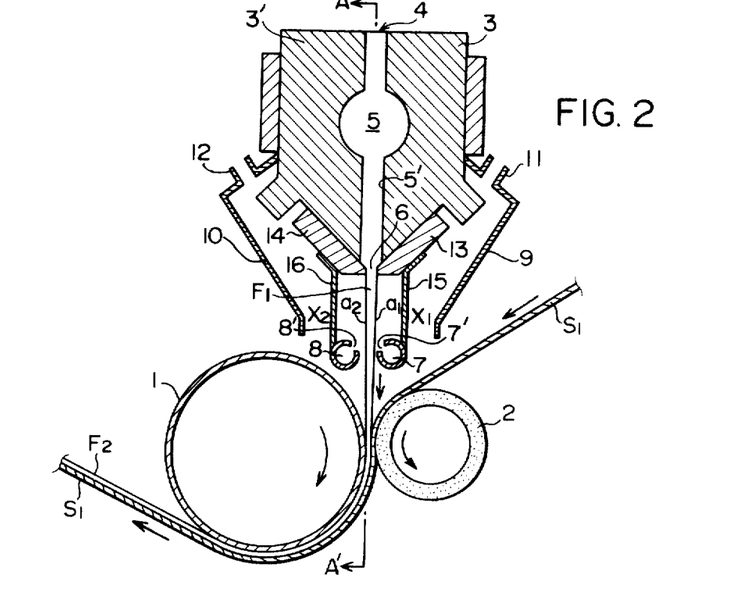
FIG. 2 is a cross-sectional view, similar to FIG. 1 of one embodiment of a T-die extrusion apparatus of this invention.
Figure 3:
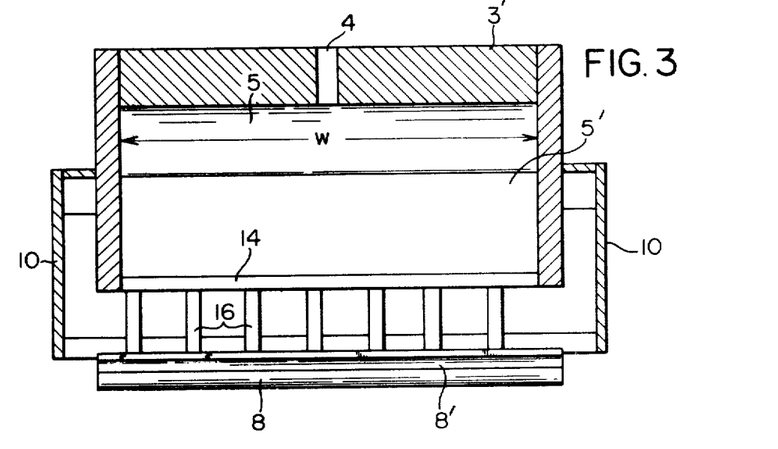
FIG. 3 is a cross-sectional view taken along line A—A' of FIG. 2.

One embodiment of an apparatus suitable for carrying out the process of this invention is shown in FIG. 2. In FIG. 3, the thermoplastic resin in the T-die, the extruded thermoplastic resin web in the molten state and the main body of the extruder are omitted.

As shown in FIGS. 2 and 3, the apparatus used to carry out the process of this invention for producing an extrusion-laminated structure composed of a substrate web $S_1$ and a thermoplastic resin web $F_1$ extrusion-coated on the substrate web $S_1$ comprises a combination of an extruder having a T-die composed of die body members 3, 3' and die jowl members 13, 14 forming a die lip and a laminating roll unit consisting at least of a pair of a cooling roll 1 and a nip roll 2 and spaced away from the die lip with an air-gap space formed between the die lip and the laminating roll unit, said apparatus further including (a) an oxidizing gas applying member 7 supported by the T-die and located at a position at which an oxidizing gas is applied in said air-gap space to that surface $a_1$ of the molten thermoplastic resin web $F_1$ extruded from the die lip which is to make contact with the substrate web $S_1$ so as to blow off volatile substances evolved from the surface $a_1$, (b) an inert gas applying member 8 supported by the T-die and located at a position at which an inert gas is applied in said air-gap space to that surface $a_2$ of the molten thermoplastic resin web $F_1$ extruded from the die lip which is to make contact with the cooling roll 1 so as to blow off volatile substances evolved from the surface $a_2$, and (c) exhaust members 9 and 10 for exhausting the volatile substances blown off by an oxidizing gas and an inert gas through said members 7 and 8, said members 9 and 10 being supported by the T-die and located in spaced-apart relationship around the members 7 and 8 respectively.

One embodiment of carrying out the process of this invention in the apparatus shown in FIGS. 2 and 3 is described below.

A flow of a thermoplastic resin obtained by heating and kneading the resin at a temperature of, say, about 310° to about 335° C. in the main body (not shown) of an extruder in FIGS. 2 and 3 enters the interior of the T-die through an entrance 4, and spreads to the width w (see FIG. 3) of the T-die in a manifold 5. Then, it flows along a die land 5', and is melt-extruded from a die lip 6 formed of die jowl members 13 and 14 to form a thermoplastic resin web $F_1$ in the molten state.

The molten web $F_1$ is passed together with a substrate $S_1$ in web form between a cooling roll 1 and a nip roll 2 of a laminating roll unit located apart from the die lip with an air-gap space formed between the die lip 6 and the laminating roll unit. The webs $F_1$ and $S_1$ are press-bonded and laminated at the point of contact of these rolls or in its viscosity, and are simultaneously cooled by the cooling roll 1.

The laminating roll unit is well known per se. In the embodiment illustrated in FIG. 2, it consists of a metallic roll 1 internally cooled by a cooling means (not shown), for example a cooling medium such as temperature-controlled water and a nip roll 2 whose peripheral surface is made of a heat-resistant material such as a silicone rubber, chloroprene rubber, nitrile rubber, butyl rubber and Hypalon (trademark) rubber. If desired, two or more pairs of such cooling and nip rolls may be employed. Furthermore, it is possible to provide a backup roll for cooling the nip roll, a peeling roll for facilitating peeling of the laminated structure from the cooling roll, or a roll for cooling the laminated structure in pair with the peel roll.

The air-gap and the take-up speed of the webs $F_1$ and $S_1$ may vary depending upon the scale of the apparatus, but optimum conditions for these can be easily chosen experimentally. For example, the air-gap may be about 70 to about 200 mm, and the take-up speed may be about 50 to about 400 meters/min.

In the production of the laminated structure composed of a substrate web and a thermoplastic resin web extrusion-coated thereon, an oxidizing gas is blown in the air-gap space against the surface $a_1$ of the molten thermoplastic resin web $F_1$ which is to make contact with the substrate web $S_1$ at a flow rate of about 0.02 to about 2 $Nm^3$, preferably about 0.05 to about 1.8 $Nm^3$, per kilogram of the thermoplastic resin extruded. As a result, volatile substances evolved from the surface $a_1$ are blown off and removed from the air-gap space. Furthermore, in the air-gap space, an inert gas is blown against the surface $a_2$ of the molten web $F_1$ which is to make contact with the cooling roll at a flow rate of about 0.02 to about 2 $Nm^3$, preferably about 0.05 to about 1.8 $Nm^3$, per kilogram of the thermoplastic resin extruded. As a result, volatile substances evolved from the surface $a_2$ are blown off and removed from the air-gap space.

In the embodiment shown in FIGS. 2 and 3, there are shown an oxidizing gas applying member 7 supported on the die jowl member 13 of the T-die by a plurality of arms 15 and an inert gas applying member 8 supported on the die-jowl member 14 of the T-die by a plurality of arms 16. Exhaust members 9 and 10 for positively exhausting the blown off volatile substances are supported by the T-die and provided in spaced-apart relationship around the members 7 and 8 respectively. In the members 7 and 8, an oxidizing gas blowing slit 7' and an inert gas blowing slit 8' which have such a length and are located at such a position that they can blow off volatile substances evolved from the surface of the web $F_1$ are provided along at least the entire width (corresponding substantially to the width w in FIG. 3) of the as-extruded molten web $F_1$ in the air-gap space. The members 7 and 8 may be those members which can blow off the volatile substances evolved from the web $F_1$ along the entire width (the width of the web $F_1$ in a direction crossing its machine direction) of the as-extruded web $F_1$, and various changes and modifications in their design are possible and are included within the scope of this invention.

The direction of applying the oxidizing gas or inert gas from the member 7 or the member 8 may be properly chosen so long as it permits positive blow-off of the volatile substances evolved from the as-extruded web $F_1$. Preferably, such a gas is applied in a direction ranging from a direction perpendicular (90°) to the web $F_1$ to the direction of the lip of the T-die (a direction crossing the surface of the web $F_1$ but is nearly parallel thereto).

In the present invention, the volatile substances evolved from the as-extruded web $F_1$ can be blown off and removed from the air-gap space in the manner described above. In order to perform this removal more exactly and to clean the working environment, exhaust members 9 and 10 as shown in FIG. 2 are provided. The exhaust members 9 and 10 prevent staying of the blown off volatile substances at places shown by $X_1$ and $X_2$ in FIG. 2, and therefore these volatile substances are prevented from being carried to the laminating portion of the laminating roll unit and taken into, or absorbed to, the laminated structure. In the drawings, the reference numerals 11 and 12 represent exhaust ports for the volatile substances to be drawn off. A suction member, or a blower member, for example, may be additionally provided for drawing off these volatile substances.

The oxidizing gas may, for example, be oxygen, ozone, air, a mixture of at least two of these, or a mixture of at least one of oxygen and ozone with an inert gas such as nitrogen, argon, helium or carbon dioxide. The inert gas to be blown from the member 8 may be those exemplified above, and is preferably nitrogen. The oxidizing gas or inert gas can be supplied from a gas supply source to a suitable part of the member 7 or the member 8 via a supply passage (not shown).

Thus, according to this invention, volatile substances causing the trouble of offensive odors, which are evolved from the as-extruded web $F_1$, can be blown off and removed from the air-gap space. Furthermore, this operation positively aids in improving adhesion of the surface $a_1$ of the web $F_1$ to the substrate web $S_1$, and conveniently prevents oxidation of the surface $a_2$ of the web $F_1$ which is to make contact with the cooling roll 1.

If in the practice of the process of this invention, the flow rate of the oxidizing gas or inert gas is less than the lower limit specified above (about 0.02 $Nm^3$ per kilogram of the thermoplastic resin extruded), the effect of removing volatile substances from the air-gap space is likely to be insufficient. If it is larger than the specified upper limit (about 2 $Nm^3$ per kilogram of the thermoplastic resin extruded), excessive deflection occurs in the as-extruded web $F_1$. Accordingly, the flow rate of the oxidizing gas or the inert gas should desirably be within the range of about 0.02 to about 2 $Nm^3$ per kilogram of the thermoplastic resin extruded. To prevent the staying of the volatile substances blown off from the surfaces of the web $F_1$ more exactly, it is preferred to exhaust them positively from the air-gap space by the means described hereinabove.

In the process of this invention, the molten thermoplastic resin web as extruded from the T-die need not be composed of a single layer. For example, it may be a web composed of multiple layers obtained by using a plurality of extruders, or a web of multiple layers having different temperatures, or a web extruded by using a T-die of the co-extrusion type. These modified embodiments are also within the scope of this invention.

In one modified embodiment, the thermoplastic resin web $F_1$ in the molten state is a multilayer thermoplastic resin web composed of at least two resin layers $f_1$ and $f_2$ melt-extruded from a lip of a T-die of the co-extrusion type, in which the layer $f_1$ having a surface to be contacted with the substrate web has a temperature (T°C.) which permits melt-lamination with the substrate web, and the layer $f_2$ having a surface to be contacted with the cooling roll has a temperature which is lower than the temperature T°C. but does not cause breakage of the web. This embodiment is shown in FIG. 4.

Figure 4:
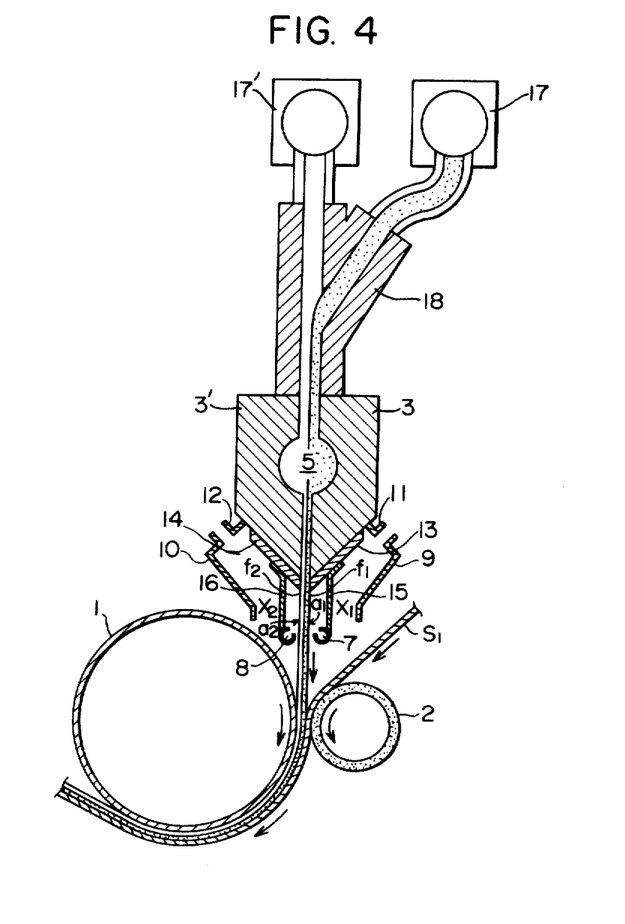
FIG. 4 is a schematic cross-sectional view of an embodiment of a co-extrusion type T-die extrusion apparatus of this invention.

Referring to FIG. 4, two resin flows extruded respectively from extruders 17 and 17' are melt-extruded from the lip of the T-die of co-extrusion type which is designed such that the resin flows get together in a black box or combining adapter 18. As a result, the resin flow shown by dots in the drawing and the resin flow shown without dots form a multilayer thermoplastic resin web composed of the resin layers $f_1$ and $f_2$. The resulting web is subjected to the treatments of blowing the oxidizing gas and the inert gas and laminated in the same way as described hereinabove with reference to FIGS. 2 and 3 to form a laminated structure composed of the substrate web $S_1$, the resin layer $f_1$ and the resin layer $f_2$. At this time, the temperatures of the resin layers should desirably be controlled such that the layer $f_1$ has a temperature (T°C.) which permits melt-lamination with the substrate web $S_1$, and the resin layer $f_2$ has a temperature which is lower than the temperature T°C. but does not cause breaking of the web composed of the layers $f_1$ and $f_2$. By this temperature control, that surface of the resin layer $f_1$ which is to make contact with the substrate web can be maintained at a high temperature which is advantageous for achieving a sufficient improvement in adhesiveness by the application of the oxidizing gas, and at times, that surface of the layer $f_2$ which is to make contact with the cooling roll can be maintained at such a low temperature which, coupled with the application of the inert gas, scarcely cause oxidation. Consequently, this temperature control further increases the effects of the process of this invention.

The controlling of the temperatures of the resin layers $f_1$ and $f_2$ can be effected by controlling the temperatures of the resins to be extruded. The temperature difference between the layers $f_1$ and $f_2$ can be properly selected. Preferably, the temperature of the layer $f_2$ is at least about 20° C. lower than the temperature T°C. of the layer $f_1$.

Figure 5:
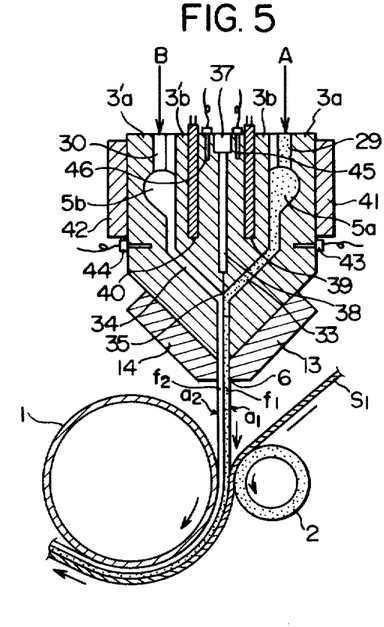
FIG. 5 is a cross-sectional view, similar to FIG. 2, of another embodiment of extrusion apparatus of this invention.

According to another embodiment of the present invention, the temperature difference between the layers $f_1$ and $f_2$ can be provided more exactly by forming separate passages for introduction of resins for forming the resin layers $f_1$ and $f_2$ within the die body of the T-die, providing a heat-insulating space between these passages, heating the die body members partitioned by the heat insulating space to different temperatures, associating the resin flows at a point downstream of the heat insulating space, and extruding the associated flow through the die lip. FIG. 5 shows an apparatus suitable for practising this modified embodiment.

Referring to FIG. 5, a resin A for forming a resin layer $f_1$ is melted and kneaded at, for example, 320° C. in a first extruder (not shown) and a resin B for forming a resin layer $f_2$ is melted and kneaded at, for example, 270° C. in a second extruder (not shown). The molten resins A and B are introduced into manifolds 5a and 5b respectively past a passage 29 for introducing the resin A and a passage 30 for introducing the resin B. In the manifolds 5a and 5b, the resins A and B spread to the entire width of the T-die as described hereinabove with reference to FIGS. 2 and 3, and then pass through passages 33 and 34. They are extruded into an associating section 35 provided downstream of a heat insulating space 38, and get together there. The associated flow is melt-extruded from a lip 6 formed of die jowl members 13 and 14 of a T-die of the co-extrusion type to form a multilayer thermoplastic resin web composed of the resin layers $f_1$ and $f_2$. In a member having a passage for extruding the resin layer $f_1$ thermally insulated by a heat insulating space 38, the resin A is kept at a predetermined temperature, for example at 320° C., by heaters 41 and thermocouples 45 provided in a die member 3a and heaters 39 and thermocouples 45 provided in a die member 3b. On the other hand, in a member having a passage for extruding the resin layer $f_2$ thermally insulated by the heat insulating space 38, the resin B is kept at a predetermined temperature, for example at 270° C., by heaters 42 and thermocouples 44 provided in a die member 3'a and heaters 40 and thermocouples 46 provided in a die member 3'b. Thus, the temperature difference between the resin layers $f_1$ and $f_2$ can be provided more exactly. The heat insulating space 38 is constructed as a plate-like chamber having a gas introducing port 37 and a gas drawing port at both ends thereof in the widthwise direction of the T-die so that a gas is introduced from the introducing port 37 and is exhausted from the gas drawing ports to further aid in the heat insulating effect of the space 38.

The T-die also includes means for applying an oxidizing gas to the surface $a_1$ of the as-extruded molten web and means for applying an inert gas to the surface $a_2$ of the as-extruded molten web as in FIG. 2 although these means are omitted in FIG. 5. The gas to be fed into the insulating space 38 may be an oxidizing gas or an inert gas of the types exemplified hereinabove, and the exhaust gas may be utilized as the oxidizing gas or the inert gas to be applied to the surfaces $a_1$ or $a_2$ of the as-extruded molten web, as shown in FIGS. 6, 7 and 8.

Figure 6:
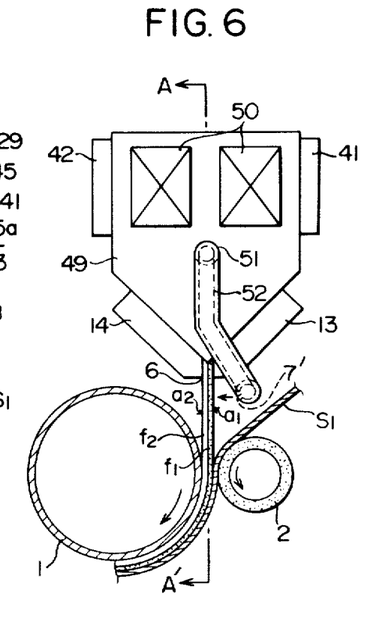
FIG. 6 is a schematic side elevation viewed from the same direction as in the cross-sectional view of FIG. 5.
Figure 7:
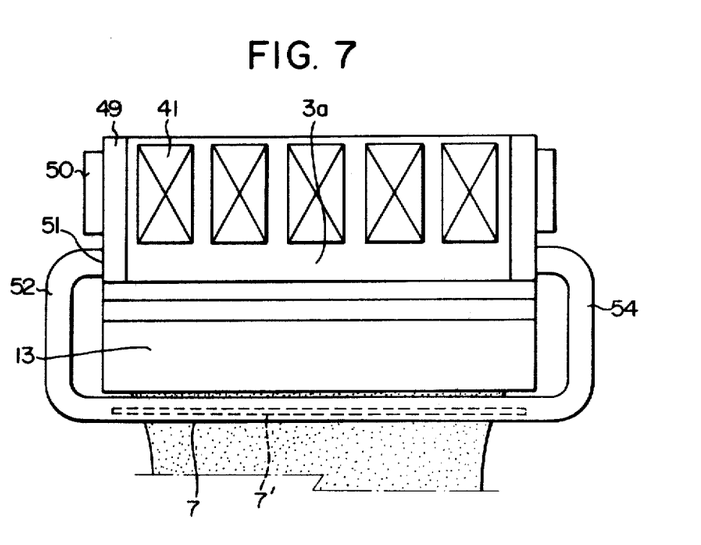
FIG. 7 is a front elevation thereof (viewed from the right side of FIG. 6) in which the substrate $S_1$ and the laminating roll unit are omitted.
Figure 8:
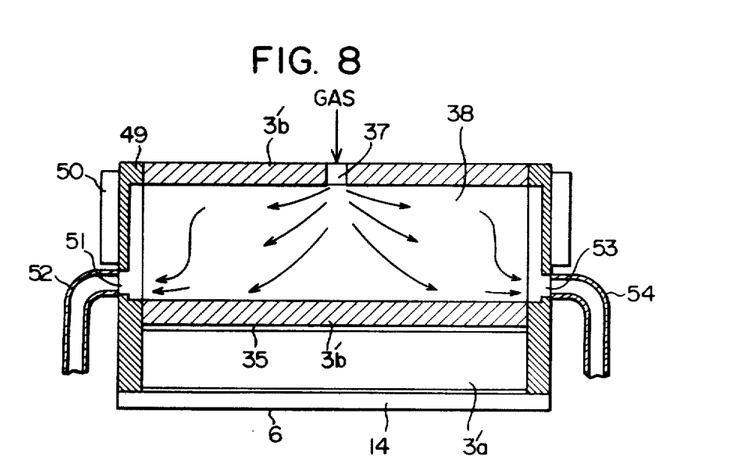
FIG. 8 is a cross-sectional view taken along line A—A' of FIG. 6, in which the substrate $S_1$ and the laminating roll unit are omitted.

In FIGS. 6, 7 and 8, the reference numeral 49 represents a side plate; 50, a heater for the side plate; 51 and 53, gas exhaust ports for drawing the exhaust gas from the heat insulating space 38; and 52 and 54, passages connected to the oxidizing gas applying member 7 illustrated in FIG. 2 for conducting the exhaust gases from the gas exhaust ports 51 and 53 to the member 7. Other reference numerals show the same parts as in FIGS. 2 to 5.

In the embodiment shown in FIGS. 6, 7 and 8, the heat insulating space 38 may be a hollow partition-like structure made of such a material as chrome-molybdenum steel. The gas which has been introduced into the heat-insulating space 38 from the introducing port 37, as is more clearly shown in FIG. 8, passes through the space 38, flows past the gas exhaust ports 51 and 53, and further flows through the passages 52 and 54, and by these passage members, the gas is discharged from the blowing slit 7' of the oxidizing gas applying member 7 supported by the T-die and is applied to the surface $a_1$ of the resin layer $f_1$ of the resin A shown in FIG. 5 which is to make contact with the substrate $S_1$. When an inert gas is used as the gas to be supplied to the heat insulating space 38, the inert gas can be blown against the surface $a_2$ of the resin layer $f_2$ of the resin B shown in FIG. 5 in the same way as above except that the gas is conducted through the passage members 52 and 54 to the inert gas blowing applying member 8 shown in FIG. 2.

The process of this invention may be performed in various modified embodiments so long as it meets the essential requirements (1) and (2) described hereinabove. Examples of the multilayer laminated structure are a substrate/thermoplastic resin web, a substrate/thermoplastic resin web/substrate, substrate/thermoplastic resin web/substrate/thermoplastic resin web and a thermoplastic resin web/substrate/thermoplastic resin web.

A wide range of thermoplastic resins can be used as the thermoplastic resin for producing the laminated structure of this invention. Examples of preferred thermoplastic resins are polyethylene, polypropylene, ethylene/α-olefin copolymers, ethylene/vinyl ester copolymers, ethylene/α,β-unsaturated carboxylic acid copolymers or the metal salts thereof, and the mixtures of at least two of these.

Specific examples of the α-olefins are α-olefins having 3 to 8 carbon atoms such as propylene, butene-1, pentene-1, hexene-1, 3-methylbutene-1, 3,3-dimethylbutene-1, 4-methylpentene-1, heptene, octene-1.

Specific examples of the vinyl esters include vinyl esters of $C_2-C_4$ carboxylic acids such as vinyl acetate and vinyl propionate, and $C_1-C_4$ alkyl esters of α,β-unsaturated carboxylic acids having 3 or 4 carbon atoms such as methyl acrylate, ethyl acrylate, butyl acrylate, isobutyl acrylate, methyl meth-acrylate, ethyl methacrylate and butyl methacrylate.

Examples of the α,β-unsaturated carboxylic acid are $C_3$ to $C_5$ α,β-unsaturated carboxylic acids such as acrylic acid, methacrylic acid, ethacrylic acid, itaconic acid, maleic acid and fumaric acid.

In the metal salts of the ethylene/α,β-unsaturated carboxylic acid copolymers, the metal ion may, for example, be $Na^+$, $K^+$, $Li^+$, $Cu^+$, $Be^{++}$, $Mg^{++}$, $Ca^{++}$, $Ba^{++}$, $Cu^{++}$, $Sn^{++}$, $Fe^{++}$, $Co^{++}$, $Zn^{++}$, $Al^{+++}$, or $Fe^{+++}$.

There is no particular limitation on the melt viscosity of the thermoplastic resin used in this invention if it permits melt-extrusion coating. From the viewpoint of the ease of laminating treatment, polyethylene or an ethylene copolymer comprising a major proportion of ethylene preferably having a melt index (MI) at 190° C. of about 1 to about 30, and polypropylene and a propylene copolymer comprising a major proportion of propylene preferably having a melt index at 230° C. of about 1 to about 30 are used.

In the multilayer thermoplastic resin web composed of at least two resin layers, the types of the resins forming the resin layers may be identical or different.

The temperature of the resin in the as-extruded thermoplastic resin web may be properly selected depending upon the thermal stability of the resin used. The upper limit of the resin temperature in the web in the molten state immediately after extrusion from the die lip may, for example, be about 330° C. for polyethylene, about 300° C. for polypropylene, about 250° C. for the ethylene/vinyl acetate copolymer, about 300° C. for an ethylene/ethyl acrylate copolymer, and about 310° C. for an ethylene/methacrylic acid copolymer. The lower limit of the temperature can be suitably selected depending upon the viscosity of the used resin, the thickness of the resin coating, etc. Depending upon these factors, the lower temperature limit may be the one at which film breakage does not occur in extrusion coating. For example, the lower limit is about 260° C. for polyethylene, about 250° C. for polypropylene, about 200° C. for the ethylene/vinyl acetate copolymer, about 250° C. for ethylene/ethyl acrylate copolymer, and about 250° C. for the ethylene/methacrylic acid copolymer.

The oxidizing gas and the inert gas to be blown against the molten thermoplastic resin web which has been extruded into the air-gap space may be at room temperature. Preferably, in order to prevent the undesirable decrease of the temperature of the as-extruded web, these gases are heated.

The material of which the substrate web used in this invention is made may be properly chosen. Examples of the material include cellulosic materials such as paperboard, kraft paper, tissue paper and cellophane; metallic material such as an aluminum, copper or tin foil; plastic materials, for example an unstretched or stretched film or sheet of a synthetic resin such as a polyolefin, a polyamide or polystyrene; and materials composed of at least two kinds of the above material, for example, a film or sheet obtained by coating such a film or sheet with vinylidene chloride, or vacuum-depositing a metal such as aluminum or copper on such a film or sheet.

Preferably, such a substrate is pre-treated by methods known in the extrusion-coating technique. The pretreatment may include, for example, anchor coat treatment, corona discharge treatment, flame treatment, preheating treatment, and combinations of these treatments.

The following examples illustrate the present invention more specifically.

In these examples, the degree of oxidation (the carbonyl group concentration) of the laminate film, the amount of gases evolved from the laminate film, and the adhesion strength of the laminated structure were measured by the following methods.

(1) Carbonyl group concentration of the laminate film

The absorbance of the carbonyl group at a wavenumber of 1720 $cm^{-1}$ was measured by a transmission method using an infrared spectrophotometer.

(2) Amount of gases evolved from the laminate film

Seven grams of a polyethylene laminate film as a sample was taken, and put into a glass vessel. The inside of the glass vessel was purged with nitrogen and maintained at 40° C. The sample was then sucked to a pressure of 3 mmHg for 30 minutes, and volatile components evolved from the laminate film were analyzed by gas chromatograpy.

The analyzing conditions in gas chromatography were as follows:
Filter: Silicon DC-200 15% (Simalite 60/80)
Carrier gas: He
Detector: FID 230° C.
Temperature raising: from 70° C. to 230° C.

(3) Adhesion strength of the laminated structure

A sample, 15 mm wide, was cut off from the laminated structure, and then delaminated at a peel speed of 300 mm/min. and a peel angle of 90° in an atmosphere kept at a temperature of 23° C. and a relative humidity of 60%. The peel strength was measured by using an autograph.

EXAMPLE 1

Polyethylene having a melt index of 6 g/10 minutes and a density of 0.923 g/cm$^3$ was melt-kneaded in an extruder, and fed to a T-die of the type shown in FIG. 2 while maintaining the resin temperature at 320° C. When the temperatures of the die body members 3 and 3' were set at 320° C., the temperature of the molten web extruded from the die was 310° C. at a point immediately below the die. The air gap was set at 100 mm, and while taking up the web at a take-up speed of 100 m/min., air heated at 100° C. was blown against the entire width of the surface $a_1$ of the molten web by a blowing device 7 at a rate of 0.2 Nm$^3$ per kilogram of the polyethylene extruded. Simultaneously, low-molecular-weight gases and air residing in the space $X_1$ were exhausted by an exhaust device 9. Furthermore, nitrogen heated at 100° C. was blown against the surface $a_2$ of the molten web at a rate of 0.2 Nm$^3$ per kilogram of the resin extruded by a blowing device 8, and simultaneously, low-molecular-weight gases and nitrogen residing in the space $X_2$ were exhausted at a rate of 30 m$^3$/min. by an exhaust device 10. In the meantime, the molten web was extrusion-coated to a thickness of 20 microns on a 20 micron-thick pre-heated aluminum foil.

The properties of the resulting laminated structure and a comparison of the offensive odor of the laminated structure with those of the laminated structures obtained in Comparative Examples 1 and 2 determined by an organoleptic test are shown in Tables 1 and 2.

It is seen that the laminated structure obtained in this Example had a very much reduced odor, and the adhesion strength between the polyethylene film and the aluminum foil was sufficiently high for practical application. Hence, it was found to be suitable as a packaging material for foodstuffs and pharmaceuticals.

COMPARATIVE EXAMPLE 1

Example 1 was repeated except that application of air to the surface $a_1$ of the molten web, the application of nitrogen to the surface $a_2$ of the molten web, and exhausting of the gasses from the spaces $X_1$ and $X_2$ by the exhaust devices 9 and 10 were not performed. The resulting laminated structure showed a stronger odor than the laminated structure obtained in Example 1.

The properties of the laminated structure and the results of the organoleptic test are shown in Tables 1 and 2.

COMPARATIVE EXAMPLE 2

The same polyethylene as used in Example 1 was melt-kneaded in an extruder, and while keeping the resin temperature at 320° C., it was fed into a conventional T-die of the type shown in FIG. 1. When the temperature of the die body was set at 320° C., the temperature of the molten web as extruded from the die was 312° C. The air-gap was set at 100 mm, and while taking up the molten web at a take-up speed of 100 m/min., and placing that surface of the molten web which was on the cooling roll side under a nitrogen atmosphere, the molten web was extrusion-coated to a thickness of 20 microns on a 20 micron-thick preheated aluminum foil. The resulting laminated structure showed a stronger odor than the laminated structure obtained in Example 1.

The properties of the laminated structure and the results of the organoleptic test are shown in Tables 1 and 2.

TABLE 1

| | Carbonyl concentration of the laminate film (number of CO per 10000 carbons) | Amount of gases evolved from the laminate film (mV · sec/g)* | Adhesion strength (g/15 mm) |
|---|---|---|---|
| Example 1 | 0.12 | 96 | 290 |
| Comparative Example 1 | 0.21 | 188 | 280 |
| Comparative Example 2 | 0.14 | 170 | 255 |

*The amount of the gases evolved from the laminate film is shown by the total peak area per gram of the sample.

EXAMPLE 2

Example 1 was repeated except that the thickness of the molten web extrusion-coated was changed to 25 microns, and a gaseous mixture of air and ozone (4:1 by volume) was used instead of the air blown against the surface $a_1$ of the molten web in Example 1.

The resulting laminated structure had very little odor, and the adhesion strength between the polyethylene web and the aluminum foil was 320 g/15 mm. Hence, the laminated structure is suitable as a packaging material.

EXAMPLE 3

An ionomer having a melt index of 5 g/10 min. obtained by partial neutralization of an ethylene/methacrylic acid copolymer having a methacrylic acid content of 10% by weight with a $Zn^{++}$ ion was melt-kneaded in an extruder, and while keeping the resin temperature at 310° C., fed into a T-die of the apparatus of this invention shown in FIG. 2. When the temperature of the die body was set at 310° C., the temperature of the resin immediately below the die was 302° C. The air gap was set at 120 mm, and the take-up speed was maintained at 100 m/min. Air heated at 100° C. was blown against the entire width of the surface $a_1$ of the molten web by a blowing device 7 at a flow rate of 0.5 Nm$^3$ per kilogram of the ionomer extruded by a blowing device 7, and simultaneously low-molecular-weight gases and air residing in the space $X_1$ were exhausted at a rate of 50 m$^3$/min. by an exhaust device. Furthermore, nitrogen heated at 100° C. was blown against the surface $a_2$ of the molten web at a rate of 0.5 Nm$^3$ per kilogram of the ionomer extruded by a blowing device 8, and simultaneously, low-molecular-weight gases and nitrogen residing in the space $X_2$ were exhausted at a rate of 50 m$^3$/min. by an exhaust device 10. In the meantime, the molten web was extrusion-coated to a thickness of 40 microns on a laminated substrate composed of cellophane, polyethylene and aluminum foil.

The resulting laminated structure had very little odors, and the adhesion between the ionomer and the aluminum foil was 520 g/15 mm. Thus, it was found to be very suitable as a packaging material for foodstuffs and pharmaceuticals.

EXAMPLE 4

Polypropylene having a melt index of 25 g/10 minutes, and a density of 0.91 g/cm$^3$ was melt-kneaded in an extruder, and introduced into a T-die of the apparatus shown in FIG. 2 while keeping the resin temperature at 300° C. When the temperature of the die body was set at 300° C., the temperature of the resin immediately below the die was 290° C. The air gap was set at 100 mm, and the take-up speed was adjusted to 100 meters/min. Air heated at 100° C. was blown against the entire width of the surface $a_1$ of the molten web at a rate of 0.35 Nm$^3$ perkilogram of the polypropylene extruded by a blowing device 7, and simultaneously low-molecular-weight gases and air residing in the space $X_1$ were exhausted at a rate of 30 m$^3$/min. by an exhaust device 9. Furthermore, nitrogen heated at 100° C. was blown against the surface $a_2$ of the molten web at a rate of 0.35 Nm$^3$ per kilogram of the polypropylene extruded by a blowing device 8, and simultaneously, low-molecular-weight gases and nitrogen residing in the space $X_2$ were exhausted by an exhaust device 10 at a rate of 30 m$^3$/min. In the meantime, the molten web was extrusion-coated to a thickness of 30 microns on a 25 micron-thick OPP substrate.

The resulting laminate had little odors, and was suitable as a packaging material for foodstuffs, etc.

EXAMPLE 5

An ethylene/vinyl acetate copolymer having a melt index of 10 g/10 min. and a vinyl acetate content of 10% by weight was melt-kneaded in an extruder, and while keeping the resin temperature at 245° C., fed into a T-die of the apparatus of this invention shown in FIG. 2. When the temperature of the body was set at 240° C., the temperature of the molten web immediately below the die was 238° C. While performing the blowing of air against the surface $a_1$, the blowing of nitrogen against the surface $a_2$ and the exhausting of low-molecular-weight gases residing in the spaces $X_1$ and $X_2$ under the same conditions as in Example 4, the molten web was extrusion-coated to a thickness of 30 microns on the polyethylene surface of a laminated substrate composed of stretched nylon and polyethylene.

The resulting laminated structure had little odors, and was suitable as a packaging material for foodstuffs, etc.

EXAMPLE 6

A co-extrusion apparatus shown in FIG. 4 was built by connecting a first extruder 17 and a second extruder 17' and a T-die with a black box 18 or an assembling tube called a combining adapter.

Polyethylene having a melt index of 4 g/10 minutes and a density of 0.923 g/cm$^3$ was melt-kneaded at a resin temperature of 325° C. in the first extruder, and polyethylene having a melt index of 7 g/10 minutes and a density of 0.917 g/cm$^3$ was melt-kneaded at a resin temperature of 280° C. in the second extruder. The two resins were introduced into the T-die through the combining tube. The temperature of the die body was set at 310° C., and the air gap, at 120 mm. The take-up speed was adjusted to 80 meters/min. Air heated at 100° C. was blown against the entire width of the surface $a_1$ of the molten web at a rate of 0.35 Nm$^3$ per kilogram of the entire resins by a blowing device 7, and simultaneously, low-molecular-weight gases and air residing in the space $X_1$ were exhausted at a rate of 50 m$^3$/min. by an exhaust device 9. Furthermore, nitrogen heated at 100° C. was blown against the surface $a_2$ of the molten web at a rate of 0.35 Nm$^3$ per kilogram of the entire resin extruded, and simultaneously, low-molecular-weight gases and nitrogen residing in the space $X_2$ were exhausted at a rate of 50 m$^3$/min. by an exhaust device 10. In the meantime, the molten web was extrusion-coated to a total thickness of 30 microns on a cellophane substrate $S_1$ whose surface had been anchor-coated with polyethyleneimine. The thickness of the resin layer from the first extruder was 15 microns, and the thickness of the resin layer from the second extruder was 15 microns. The carbonyl group concentration of the laminate film was 0.11 per 10000 carbons, and the laminated structure had little odors. The adhesion strength between the substrate and the polyethylene was 320 g/15 mm. Hence, the laminated structure obtained was found to be very suitable as a packaging material for foodstuffs and pharmaceuticals.

EXAMPLE 7

Example 1 was repeated except that the amount of heated air to be applied to the surface $a_1$ was changed to 0.05 Nm$^3$ per kilogram of the resin extruded, and the amount of heated nitrogen applied to the surface $a_2$ was changed to 0.05 Nm$_3$.

The resulting laminated structure was stronger than that of the laminated structure obtained in Example 1 but was weaker than that of the laminated structure obtained in Comparative Example 1. The results of the organoleptic test for odors are shown in Table 2.

COMPARATIVE EXAMPLE 3

Example 1 was repeated except that the amount of heated air applied to the surface $a_1$ was changed to 0.01 Nm$^3$ per kilogram of the resin extruded, and the amount of heated nitrogen applied to the surface $a_2$ of the molten web was changed to 0.01 Nm$^3$ per kilogram of the resin extruded.

The laminated structure obtained gave off a strong odor, and no effect in improvement was noted. The results of the organoleptic test for odors are shown in Table 2.

EXAMPLE 8

An ethylene/vinyl acetate copolymer having a melt index of 3.5 g/10 min. and a vinyl acetate content of 6% by weight was melt-kneaded in an extruder, and while keeping the resin temperature at 240° C., fed into a T-die of the invention shown in FIG. 2. When the temperature of the die body was set at 240° C., the temperature of the molten web immediately below the die was 235° C. Heated air was blown against the surface $a_1$ of the molten web at a rate of 1.8 Nm$^3$ per kilogram of the resin extruded, and simultaneously, low-molecular-weight gases and air residing in the space $X_1$ were exhausted at a rate of 50 m$^3$/min. by an exhaust device 9. Moreover, heated nitrogen was blown against the surface $a_2$ of the molten web by a blowing device 8 at a rate of 1.8 Nm$^3$ per kilogram of the resin extruded, and simultaneously, low-molecular-weight gases and nitrogen residing in the space $X_2$ were exhausted at a rate of 50 m$^3$/min. by an exhaust device 10. In the meantime, the molten web was extrusion-coated to a thickness of 70 microns on the polyethylene surface of a laminated substrate consisting of stretched nylon and polyethylene while setting the air gap at 100 mm and the processing speed at 60 meters/min.

The resulting laminated structure was substantially free from an offensive odor, and was suitable as a packaging material for foodstuffs, etc.

COMPARATIVE EXAMPLE 4

Example 8 was repeated except that the amount of hot air blown against the surface $a_1$ was changed to 2.5

Nm³ per kilogram of the resin extruded, and the amount of heated nitrogen blown against the surface $a_2$ of the molten web was changed to 2.5 Nm³ per kilogram of the resin extruded. Deflection of the molten web was remarkable, and a laminated structure having good quality could not be obtained.

TABLE 2

| Run No. | Combination of laminated structures | Results of the organoleptic test (the number of panelists) |
|---|---|---|
| 1 | Example 1/Comparative Example 1 | 10/0 |
| 2 | Example 1/Comparative Example 2 | 10/0 |
| 3 | Example 7/Comparative Example 1 | 10/0 |
| 4 | Example 1/Comparative Example 3 | 10/0 |
| 5 | Example 7/Comparative Example 3 | 10/0 |

The figures in the table show the number of panelists who evaluated the laminated structure as "good" by an organoleptic test because it had little odor.

For example, in Run No. 1, "10/0" means that there were ten panelists who evaluated the laminated structure of Example 1 as good, but no panelist evaluated the laminated structure of Comparative Example 1 as good.

EXAMPLE 9

Polyethylene (A) having a melt index of 4 g/10 minutes and a density of 0.923 g/cm³ was melt-kneaded in a first extruder, and while keeping the resin temperature at 325° C., fed into a manifold 5a of the co-extrusion T-die shown in FIG. 5. At this time, the temperatures of the die body 3a and the block 3b on the substrate side of the partitioning plate were set at 325° C. In the meantime, polyethylene (B) having a melt index of 7 g/10 minutes and a density of 0.920 g/cm³ was melt-kneaded in a second extruder, and while keeping the resin temperature at 260° C., was fed into a manifold 5b. At this time, the temperatures of the die body member 3'a and the block 3'b were set at 260° C. The resin flows A and B from the two manifolds were associated at a point 35 of association, and extruded from the die lip 6. Simultaneously, nitrogen was introduced at a rate of 20 Nm³/hr into the hollow partitioning member through a gas introducing port 37, and caused to flow through a gas flowing passage 38. Nitrogen was blown against the surface $a_2$ of the molten web from the blowing port 7' with the conduits 52 and 54 of FIGS. 6 and 7 provided in reverse relation as shown in FIGS. 6 to 8. In the meantime, the molten web was extrusion-coated to a total thickness of 20 microns on a corona discharge-treated surface of unbleached kraft paper while adjusting the processing speed at 150 meters/min. and the air gap at 140 mm. The amounts of extrusion of the two extruders were controlled such that the thickness of the polyethylene A layer and the thickness of the polyethylene B layer each occupied 50% of the total coat thickness (20 microns).

The properties of the laminated structure are shown in Table 3 together with those of the extrusion-laminated structure obtained in Comparative Example 5. It is seen that the laminated structure obtained in this Example had little odors, and excellent heat-seal strength.

TABLE 3

| Sample | Adhesiveness | Heat seal strength (g/15 mm) 180° C. | 200° C. | 220° C. | Odor |
|---|---|---|---|---|---|
| Example 9 | 96.6 | 960 | 1055 | 955 | 10 |
| Comparative Example 5 | 96.9 | 700 | 845 | 740 | 0 |

The tests were conducted as follows:

(1) Adhesiveness

A bond tester was used, and a pressure was applied to the polyethylene surface of a kraft/PE coat sample (the bursting pressure at this time is designated "A"), and a pressure was also applied to the kraft surface of the sample (the bursting pressure at this time is designated "B").

The adhesiveness was calculated from the following equation.

$$\text{Adhesiveness } (\%) = \frac{B}{A} \times 100$$

(2) Heat seal strength

Measured under the following conditions.
Seal pressure: 3 kg/cm²
Seal time: 1 second
Peel velocity: 300 mm/min.
Peel angle: 90°

(3) Test for odors

The odor of the polyethylene surface of the sample was evaluated by an organoleptic test, and the number of panelists who evaluated it as "good" was determined.

COMPARATIVE EXAMPLE 5

Polyethylene having a melt index of 4 g/10 minutes and a density of 0.923 g/cm³ was melt-kneaded to a resin temperature of 325° C. in an extruder, and fed into a T-die of the prior art shown in FIG. 1 which was kept at 325° C. The molten resin was extruded from the exit of the die as a molten web. It was extrusion-coated on a corona discharge-treated unbleached kraft paper at a processing speed of 150 m/min. to a thickness of 20 microns while the air gap was adjusted to 140 mm.

The properties of the resulting laminated structure are shown in Table 3.

EXAMPLE 10

Polypropylene having a melt index of 20 g/10 minutes and a density of 0.91 g/cm³ was melt-kneaded at a resin temperature of 300° C. in a first extruder, and fed into a manifold 5a of a co-extrusion T-die of the invention shown in FIG. 5. At this time, the temperatures of the die body member 3a and the block 3b on the substrate side were set at 300° C. In the meantime, the same polypropylene was melt-kneaded at a resin temperature of 260° C. in a second extruder, and fed into a manifold 5b on the opposite side to the substrate. At this time, the temperatures of the die body member 3'a and the block 3'b were set at 260° C. The resin flows from the two manifolds were associated at a point 35 of association, and extruded from a die lip 6. At the same time, nitrogen was introduced from the gas introducing port 37 into the partitioning member at a rate of 20 Nm³/hr, and caused to flow through the gas flow passage 38. The conduits 52 and 54 in FIGS. 6 and 7 were mounted in reverse relationship, and the above nitrogen was blown against the surface $a_2$ of the molten web from the blowing port 7', and the molten web was extrusion-coated to a total thickness of 20 microns on a 20 micron-thick biaxially oriented polypropylene film substrate at a processing speed of 120 m/min. while the air gap was set at 90 mm. The amounts of extrusion in the two extruders were controlled such that the thickness of the polypropylene layer at a higher temperature and the thickness of the polypropylene layer at a lower temperature each occupied 50% of the total coat thickness.

The properties of the laminated structures are shown in Tables 4 and 5 together with the data for Comparative Example 6.

It is seen that the laminated structure obtained in this Example had better heat seal strength and hot tack sealability than the product of the prior art in Comparative Example 6.

TABLE 4

| Sample | Adhesion strength (g/15 mm) | Heat seal strength (g/15 mm) | | | | |
|---|---|---|---|---|---|---|
| | | 130° C. | 140° C. | 150° C. | 160° C. | 170° C. |
| Example 10 | 175 | 110 | 250 | 715 | 1130 | 1245 |
| Comparative Example 6 | 175 | 65 | 160 | 555 | 975 | 1125 |

TABLE 5

| Sample | Hot tack sealability (delamination distance, mm) | | | | |
|---|---|---|---|---|---|
| | 130° C. | 140° C. | 150° C. | 160° C. | 170° C. |
| Example 10 | 300 | 49 | 46 | 17 | 12 |
| Comparative Example 6 | 300 | 64 | 50 | 28 | 53 |

The hot tack sealability was determined as follows:

Two laminated structures were heat-sealed while attaching a 45 g-weight to one end of each laminated structure so that as soon as a seal bar moved away after heat sealing, the two weights acted as a peel force at an angle of 23°. The delamination distance of the sealed part was measured.

The heat sealing was performed for 0.5 second at a sealing pressure of 3 kg/cm$^2$. The smaller the delamination distance, the better is the hot tack sealability.

COMPARATIVE EXAMPLE 6

The same polypropylene as used in Example 10 was melt-kneaded at a resin temperature of 300° C. in an extruder, and fed into a known T-die shown in FIG. 1 kept at 300° C., and extruded from the die exit as a molten web. The molten web was extrusion-coated to a thickness of 20 microns on a 20 micron-thick biaxially oriented polypropylene film substrate at a processing speed of 120 meters/min. The air gap was set at 90 mm. The properties of the resulting laminated structure are shown in Tables 4 and 5.

EXAMPLE 11

Polyethylene having a melt index of 7 g/10 minutes and a density of 0.917 g/cm$^3$ was melt-kneaded in a first extruder, and while keeping the resin temperature at 320° C., fed into a manifold 5a on the substrate side of the co-extrusion T-die shown in FIG. 5. At this time, the temperatures of the die body 3a and the block 3b on the substrate side of the partitioning member were set at 320° C. In the meantime, an ionomer of an ethylene/methacrylic acid copolymer with a Zn ion having a melt index of 5 g/10 minutes was melt-kneaded in a second extruder, and while keeping the resin temperature at 300° C., fed into the opposite manifold 5b. At this time, the temperatures of the die body member 3'a and the block 3'b were set at 300° C. The two resin flows were associated at a point 35 of association and extruded from the die lip 6. Simultaneously, nitrogen was introduced at a rate of 10 Nm$^3$/hr from the gas introducing port of the partitioning plate, and caused to flow through the gas flowing passage 38. The conduits 52 and 54 of FIGS. 6 and 7 were mounted in reversed relationship, and the nitrogen was blown against the surface a$_2$ of the molten web from the blowing port 7', and the molten web was extrusion-coated at a processing speed of 120 meter/min. on the aluminum surface of a laminated substrate composed of paper, PE and Al which had been anchor-coated with an organotitanate anchor-coat agent to a total coat thickness of 23 microns (the polyethylene layer 13 microns, the ionomer layer 10 microns) so that the polyethylene surface contacted the aluminum foil. The air gap was set at 140 mm.

The resulting laminated structure had a sufficient adhesion strength, and was scarcely malodorous. Furthermore, it had excellent heat sealing properties.

Table 6 shows the heat seal strength of the laminated structure, and Table 7 shows the hot tack sealability of the laminated structure.

TABLE 6

| Sample | Heat seal strength (g/15 mm) | | | | | |
|---|---|---|---|---|---|---|
| | 100° C. | 110° C. | 120° C. | 130° C. | 140° C. | 150° C. |
| Example 11 | 770 | 1140 | 1280 | 1450 | 1440 | 1440 |

TABLE 7

| Sample | Hot tack sealability (delamination distance, mm) | | | | | |
|---|---|---|---|---|---|---|
| | 110° C. | 120° C. | 130° C. | 140° C. | 150° C. | 160° C. |
| Example 11 | 59 | 16 | 11 | 12 | 11 | 12 |

What we claim is:

1. In a process for producing a laminated structure composed of a substrate web and a thermoplastic resin web extrusion-coated thereon which comprises melt-extruding a thermoplastic resin from the lip of a T-die composed of a die body and a die jowl to form a thermoplastic resin web in the molten state and passing the thermoplastic resin web together with a substrate in web form through a laminating roll unit consisting at least of a pair of a cooling roll and a nip roll and located apart from the die lip with an air-gap space formed between the die lip and the laminating roll unit, the improvement comprising (1) blowing an oxidizing gas selected from the group consisting of oxygen, ozone, air, a mixture of at least two of these, and a mixture of at least one of oxygen and ozone with an inert gas in said air-gap space to that surface of the molten thermoplastic resin web which is to make contact with the substrate web, at a flow rate of about 0.02 to about 2 Nm$^3$ per kilogram of the thermoplastic resin extruded, whereby volatile substances evolved from said surface of the molten thermoplastic resin web are blown off said surface and removing said oxidizing gas and said volatile substances from the air-gap space, and (2) blowing an inert gas in said air-gap space to that surface of the molten thermoplastic resin web which is to make contact with the cooling roll, at a flow rate of about 0.02 to about 2 Nm³ per kilogram of the thermoplastic resin extruded, whereby volatile substances evolved from the surface of the molten thermoplastic resin web are blown off said surface and removing said inert gas and said volatile substances from the air-gap space.

2. The process of claim 1 wherein the thermoplastic resin web in the molten state is a multilayer thermoplastic resin web in the molten state composed of at least two resin layers melt-extruded from a lip of a T-die of the co-extrusion type, in which the layer having a surface to be contacted with the substrate web has a temperature (T°C.) which permits melt-lamination with the substrate web, and the layer having a surface to be contacted with the cooling roll has a temperature which is lower than the temperature T°C. but does not cause breakage of the web.

3. The process of claim 1 wherein the thermoplastic resin is polyethylene, polypropylene, an ethylene/α-olefin copolymer, an ethylene/vinyl ester copolymer, an ethylene/α,β-unsaturated carboxylic acid copolymer or its metal salt, or a mixture of at least two of these.

4. The process of claim 1 wherein the substrate is composed of a cellulosic material, a metallic material, a plastic material or a combination of at least two of them.

5. The process of claim 1 wherein the air-gap space is in the range of from about 70 to about 200 mm.

6. The process of claim 1 wherein said oxidizing gas and volatile substances and inert gas and volatile substances which have been blown off from the opposite surfaces of said molten thermoplastic resin web are removed from the air-gap space at a rate of from about 30 to about 50 m³/min.

7. The process of claim 1 wherein the flow rates of the oxidizing gas and the inert gas are each within the range of from about 0.05 to about 1.8 Nm³ per kilogram of the extruded thermoplastic resin.

8. The process of claim 1 wherein the oxidizing gas and the inert gas are each blown against the surfaces of the molten thermoplastic resin web in a direction ranging from a direction perpendicular to the web to the direction of the lip of the T-die.

9. An apparatus for producing an extrusion-laminated structure composed of a substrate web and a thermoplastic resin web extrusion-coated thereon which comprises a combination of an extruder having a T-die composed of a die body and a die jowl forming a die lip and a laminating roll unit composed at least of a pair of a cooling roll and a nip roll and spaced away from the die lip with an air-gap space formed between the die lip and the laminating roll unit, said apparatus further including (a) an oxidizing gas applying member supported by the T-die and located at a position for blowing an oxidizing gas in said air-gap space to that surface of the molten thermoplastic resin web extruded from the die lip which is to make contact with the substrate web so as to blow off volatile substances evolved from that surface of the molten web, (b) an inert gas applying member supported by the T-die and located at a position for blowing an inert gas in said air-gap spaced to that surface of the molten thermoplastic resin web extruded from the die lip which is to make contact with the cooling roll so as to blow off volatile substances evolved from that surface of the molten web, and (c) exhaust members for exhausting the volatile substances blown off by said oxidizing and inert gas applying members, said exhaust members being supported by the T-die and located in spaced-apart relationship around the members for applying the oxidizing gas and the inert gas respectively.

10. The apparatus of claim 9 wherein said oxidizing gas applying member (a) and said inert gas applying member (b) are each located in said air-gap space on opposite sides of said die lip.

* * * * *